United States Patent Office 2,929,721
Patented Mar. 22, 1960

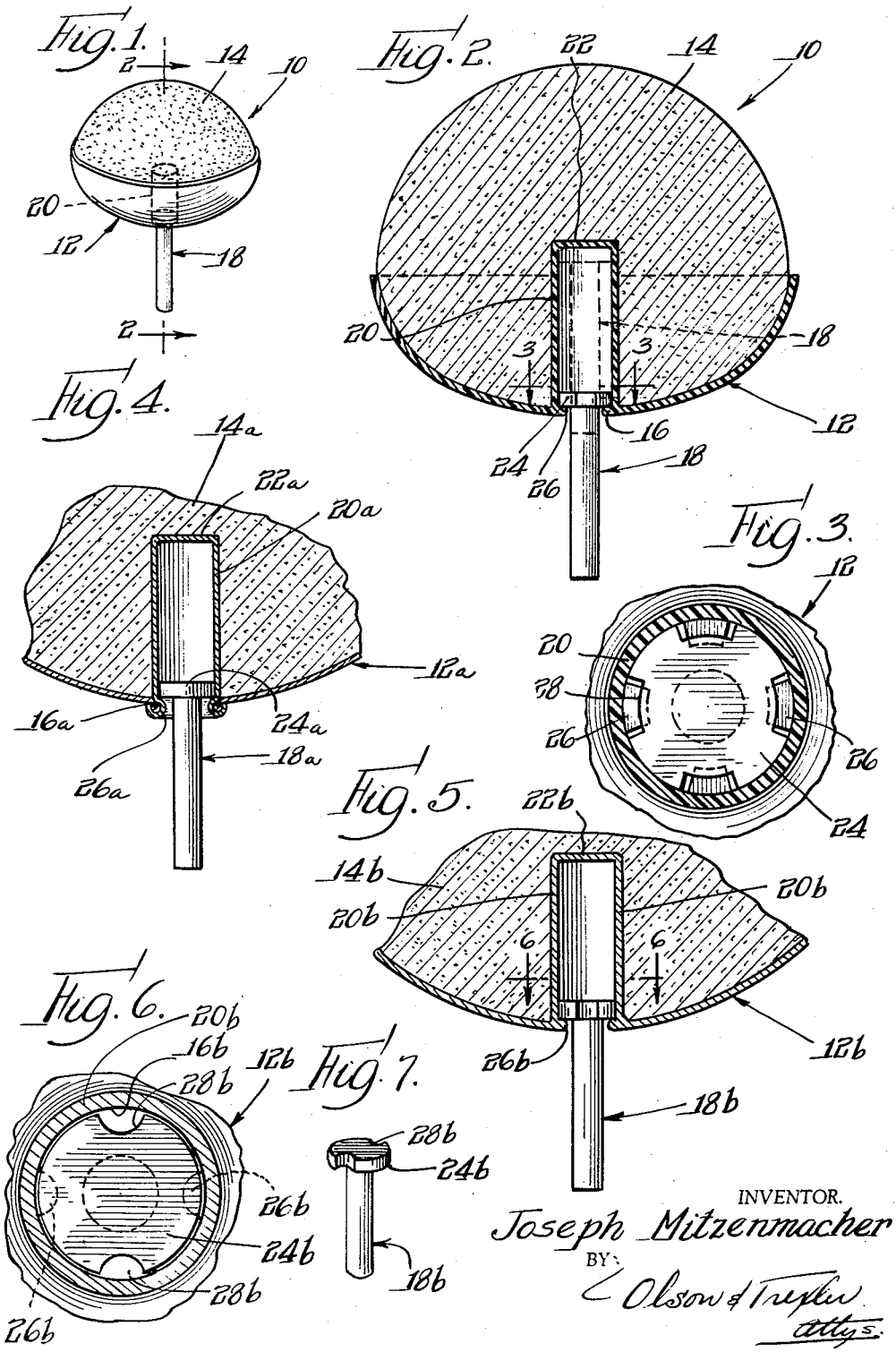

2,929,721

CONFECTION

Joseph Mitzenmacher, Evanston, Ill.

Application March 1, 1957, Serial No. 643,276

3 Claims. (Cl. 99—137)

The present invention relates to a novel confection, and more particularly to a novel confection comprising ice cream or the like and a holder therefor.

Numerous ice cream confections have heretofore been suggested and have been made available commercially even though they are subject to one or more disadvantages. For example, ice cream confections having sticks protruding therefrom are generally available, but such confections require an undue amount of storage space as a result of the protruding sticks and such confections frequently are difficult to eat in that considerable care must be taken to prevent dripping. It is an important object of the present invention to provide a novel confection whereby the above mentioned difficulties are eliminated and more particularly to provide a novel confection which is constructed so as to reduce any possibility of the ice cream dripping and also to provide handle means which may be manipulated so as substantially to reduce the space requirements for storing or shipping.

A more specific object of the present invention is to provide a novel confection including a frozen food or the like in a holder or open container, and handle means associated with the container so that it may be shifted from an extended operative position to a retracted inoperative position substantially within the body of frozen food or the like in the container so as to minimize shipping and storage space requirements.

Another more specific object of the present invention is to provide a confection having a container and retractable handle of the type mentioned above, which handle is substantially rigid and is connected with the container in a manner which enables the confection to be firmly supported by the handle.

Still another object of the present invention is to provide a novel confection of the above described type wherein the container and handle assembly may be constructed so as to be reusable, or disposable and wherein at least the container may be formed from an edible material.

A further object of the present invention is to provide a novel confection of the above described type which is of simple construction and may be economically produced.

Other objects and advantages of the present invention will become apparent from the following description and the accompanying drawings, wherein:

Fig. 1 is a perspective view showing a confection incorporating the features of the present invention;

Fig. 2 is an enlarged partial cross sectional view taken along the line 2—2 in Fig. 1;

Fig. 3 is a further enlarged cross sectional view taken along line 3—3 in Fig. 2;

Fig. 4 is a fragmentary partial sectional view similar to Fig. 2 but shows a modified form of the present invention;

Fig. 5 is a fragmentary view similar to Fig. 4 but shows a further modified form of the present invention;

Fig. 6 is an enlarged cross sectional view taken along line 6—6 in Fig. 5; and

Fig. 7 is a perspective view showing a handle member for use in the structure of Figs. 5 and 6.

Referring now more specifically to the drawings wherein like parts are designated by the same numerals throughout the various figures, a confection 10 incorporating the features of the present invention is shown in Figs. 1–3. In this embodiment the confection comprises a dish-shaped holder or container 12 which at least partially receives a body 14 of ice cream or any other desired foodstuff.

In accordance with an important feature of the present invention the container 12 is provided with a central aperture 16 through which a handle member 18 projects, and an upstanding tubular element 20 has its open lower end secured to a bottom portion of the container and aligned with the aperture and provides a housing for the handle member or stem 18. In Figs. 1 and 2 the handle member or stem is shown in an extended operative position, and Fig. 2 further shows the handle member or stem in broken lines at a retracted position. When in the retracted position, the handle member or stem is substantially completely housed within the tubular element 20 so that it requires substantially no space outside of the container for shipping or storing purposes. The upper end of the tubular element 20 is preferably closed by partition 22 so as to prevent ice cream or the like from dripping through the tubular element. The end partition 22 also provides a stop for limiting inward movement of the handle member or stem. It will be noted that the overall length of the handle member is slightly greater than the distance between the end partition 22 and the outer surface of the container 12 so that a short portion of the handle member projects to enable the handle member to be grasped and manually pulled out to the extended operative position.

In order to prevent the handle member or stem 18 from being inadvertently pulled entirely out of the container, the handle member is provided with an enlarged head portion 24 and the container is provided with a plurality of shoulder elements 26 circumferentially spaced around the margin of the aperture 16 and projecting radially inwardly for engagement beneath the head 24. The shoulder elements 26 are resilient and the head portion 24 of the handle or stem is provided with a plurality of recesses 28 so that the head portion may be assembled with the container by aligning the recesses with the shoulder elements and forcing the handle member inwardly until the head portion is snapped within the shoulder elements. Then the handle is preferably turned so that the shoulder elements will fully engage the head portion, but it is to be noted that the radial extent of each shoulder element is greater than the radial extent of each recess 28 so that the shoulder elements will always engage beneath the head portion. It will also be noted that the outside diameter of the head portion 24 is such that the head portion fits snugly within the upstanding tubular element 20 so as to resist tilting of the handle member and to enable the handle member to provide a firm sturdy support for the container.

In the embodiment shown in Figs. 1–3, the container 12 and the upstanding tubular element 20 are integrally joined. These elements may be readily molded or otherwise formed from various suitable materials. This embodiment shows the integrally joined container and tubular element formed from plastic material and the handle member or stem is also molded from a suitable plastic material. One advantage of this is that, if desired, the purchaser may save the container and handle assembly after the food material 14 has been eaten and reuse the device by home filling the container.

In Fig. 4 there is shown a modified form of the present invention which is similar to the described structure and indicated by the application of identical reference numerals with the suffix *a* added to corresponding elements. In this embodiment, the container 12a and the upstanding element 20a are formed from a more economical paper material. In addition these elements are formed separately, and the lower end of the tubular element is joined in a rolled bead 26a with the margin of the container aperture 16a. The head portion 24a of the handle member of this embodiment is preferably uninterrupted and is inserted into the tubular member before the tubular member is joined with the container. While in this embodiment the container 12a and tubular element 20a are shown as being formed from paper, it is to be understood that they could also be formed from plastic or other suitable materials, if desired, and the corresponding elements of the embodiment of Figs. 1–3 similarly could be formed from paper or other suitable materials rather than plastic, if desired.

Figs. 5–7 shows another embodiment of the present invention which is similar to the above described structures as indicated by the application of identical reference numerals with the suffix *b* added to corresponding elements. This embodiment differs from the above described structures principally in that the dished container 12b and upstanding tubular element 20b are formed from an edible wafer-like material. Thus, with this embodiment the entire confection except for the handle 18b which is still made of plastic or any other suitable relatively rigid material can be eaten.

While the preferred embodiments of the present invention have been shown and described herein, it is obvious that many structural details may be changed without departing from the spirit and scope of the appended claims.

The invention is claimed as follows:

1. A confection of the type described comprising a container having a generally central aperture through a bottom portion thereof, an upstanding hollow element having a substantially circular cross sectional shape and an open lower end joined to said container bottom portion and aligned with said aperture, a plurality of equally circumferentially spaced discrete shoulder elements connected to and partially traversing said open lower end of the hollow element, a body of food material in said container and enveloping said upstanding element, and a substantially rigid handle retractably mounted in the hollow element, said handle having a length similar to and greater than the length of the hollow element, whereby the handle positioned in the hollow element in a retracted position provides a short protruding portion of the handle for manual retraction of the handle from within the food material thereby providing a support for the confection said handle including an enlargement rotatably disposed in said hollow element and projecting over said shoulder elements for preventing complete removal of the handle from said hollow element, and said enlargement having a plurality of recess means circumferentially spaced in the same manner as said discrete shoulder elements and through which said shoulder elements may pass when the handle is rotated to align the recess means with the shoulder elements during assembly of the handle with the hollow.

2. A confection of the type described comprising an upstanding tubular member having a predetermined axial length, a substantially closed upper end and a substantially circular cross sectional shape, a body of food material substantially enveloping said upstanding tubular member and covering said closed upper end, said tubular member also including an exposed lower end and a plurality of circumferentially spaced discrete shoulder elements connected with and partially traversing said open lower end, and a substantially rigid stem axially shiftably disposed in said tubular member and having an overall length similar to but slightly greater than said length of the tubular member, said stem including an enlarged head portion rotatably disposed within said tubular member and engageable with said shoulder elements for preventing the stem from being completely withdrawn from said tubular member, said enlarged head portion having a plurality of circumferentially spaced recess means alignable with said shoulder elements for enabling the stem to be assembled within the tubular member, said stem being shiftable to and from a retracted position substantially entirely within said tubular member and an extended position projecting substantially below said tubular member.

3. A confection, as defined in claim 2, wherein said shoulder elements are resilient and project radially inwardly of the tubular member a distance similar to but slightly greater than a predetermined radial depth of said recess means in said enlarged head portion for enabling the head portion to be snapped past the shoulder elements during assembly of the stem with the tubular member.

References Cited in the file of this patent

UNITED STATES PATENTS

| | | |
|---|---|---|
| 1,406,841 | Foss | Feb. 14, 1922 |
| 1,652,789 | Moore | Dec. 13, 1927 |
| 1,768,425 | Smith | June 24, 1930 |
| 1,835,719 | Parr | Dec. 8, 1931 |
| 1,952,688 | Schnaier | Mar. 27, 1934 |
| 2,085,330 | Price | June 29, 1937 |
| 2,855,312 | Kielsmeier | Oct. 7, 1958 |